Patented Oct. 25, 1932

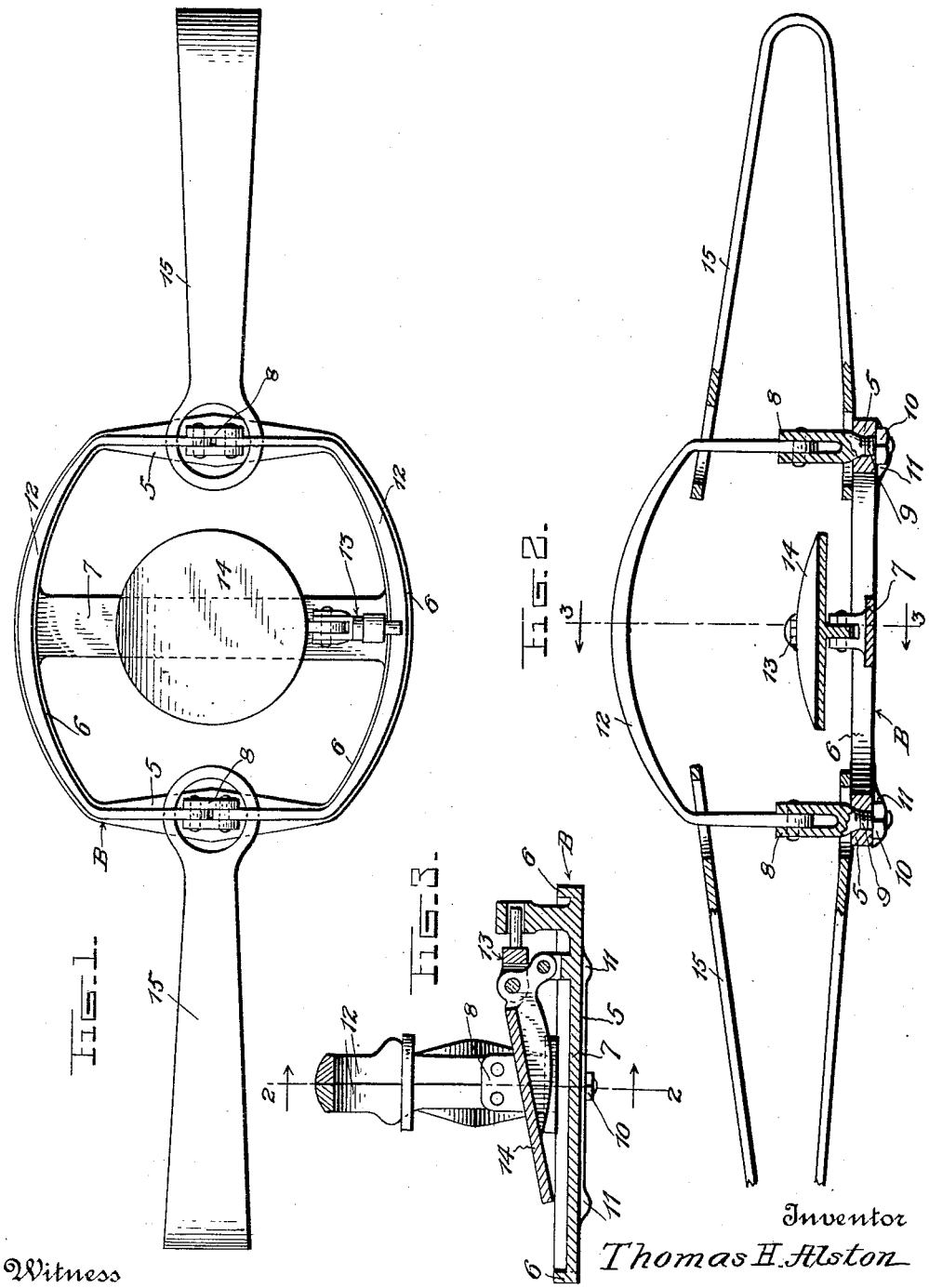

1,884,499

UNITED STATES PATENT OFFICE

THOMAS H. ALSTON, OF PAGASO SPRINGS, COLORADO

ANIMAL TRAP

Application filed October 15, 1930. Serial No. 488,923.

The invention relates to improvements in traps of the general type known as steel traps, in which two U-shaped jaws are held in lowered set position by latch means and are upwardly closable by spring pressure upon release of said latch means. When traps of this type are set, the jaws lie substantially upon the ground and in cases where they remain set during repeated daytime thaws and overnight freezes, and in fact under other known conditions also, the jaws often become frozen into or to the ground, thus interfering with quick action of said jaws, if permitting such action at all. Moreover, traps of the type in question, due to their base constructions, are more or less unstable, both when setting, and prior to being sprung, after setting. It is the object of my invention therefore to provide a trap having a new and improved base which will render the trap much more stable and will prevent its jaws from touching the ground and consequently freezing to or in the latter.

With the foregoing in view, the invention resides in the novel subject matter hereinafter described and claimed, description being accomplished by reference to the accompanying drawing.

Fig. 1 is a top plan view showing the trap set.

Fig. 2 is a longitudinal sectional view on line 2—2 of Fig. 3, the jaws being in closed position.

Fig. 3 is a transverse sectional view on line 3—3 of Fig. 2.

A preferred construction has been illustrated and will be specifically described, with the understanding that within the scope of the invention as claimed, variations may be made.

The improved trap base B embodies two horizontal end bars 5, two outwardly bowed horizontal side bars 6 integrally joined at their ends to the ends of the bars 5, and a central transverse horizontal bar 7 extending between and integrally joined to the side bars 6. The central portions of the end bars 5 are widened and are provided with upstanding posts 8 which are secured thereto in any preferred manner, screw threads 9 and nuts 10 being preferably employed in connecting said posts and bars.

Preferably, the lower edge of the base B is provided with lugs 11 at the juncture of the end and side bars 5 and 6 respectively, the lower extremities of said lugs being about in the same plane with the lower sides of the nuts 10.

The usual U-shaped jaws 12 are pivoted to the posts 8, and appropriate latch means 13 having a releasing treadle 14, is mounted upon the bar 7 for engagement with one of said jaws to hold the latter in lowered, set position. When these jaws are thus held set, their curved intermediate portions overlie the side bars 6 of the base B and their straight end portions overlie the end bars 5. Thus, said bars 5 and 6 prevent the jaws 12 from touching the ground and consequently they cannot freeze to or into the latter. Moreover, in addition to performing this advantageous function, the construction of the base B is such as to impart greater stability to the trap when setting the same, entailing compression of the conventional springs 15. Then too, after the trap has been set, there is less liability of animals tipping it over or onto edge, before springing.

If desired, the trap may be plated to render it scent-proof, in accordance with my prior U. S. Patent No. 1,539,103, but it will be obvious that the present application is not restricted to any such plating, nor to any extent except that to which restricted by the wording used in claiming the features of novelty.

I claim:—

A trap comprising a horizontal base frame having end bars, side bars integral with said end bars, and a flat horizontal transverse bar extending between and integral with the central portions of said side bars, said transverse bar lying wholly within the zone surrounded by said end and side bars, upstanding posts secured to the central portions of said end bars, two U-shaped jaws pivoted to said posts and shaped to overlie said end and side bars of the base frame, two double-arm springs projecting outwardly in opposite directions from said end bars, the upper ends of said springs having openings to surround said posts when the trap is set and to surround the ends of the jaws when the trap is sprung, the lower ends of said springs having openings through which said posts pass, a trigger plate overlying said transverse bar and pivotally mounted on one end of the same, a horizontally slidable latch pin pivotally connected with said trigger plate to overlie one of said jaws to hold the latter set, and a guide projecting upwardly from said one end of said transverse bar and slidably receiving said latch pin.

In testimony whereof I affix my signature.

THOMAS H. ALSTON.